United States Patent
Keys et al.

(10) Patent No.: US 6,416,095 B1
(45) Date of Patent: *Jul. 9, 2002

(54) BODY SIDE MOULDING

(75) Inventors: James F. Keys, Northville, MI (US); David S. Harris, Peterborough (GB)

(73) Assignee: Cooper Technology Services, LLC, Findlay, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,543

(22) Filed: May 5, 1999

(30) Foreign Application Priority Data

May 5, 1998 (GB) .............................. 9809568

(51) Int. Cl.$^7$ .............................. B60R 19/42
(52) U.S. Cl. .................... 293/128; 293/126; 296/901
(58) Field of Search .................... 296/901; 293/126, 293/128

(56) References Cited

U.S. PATENT DOCUMENTS

| | | | | |
|---|---|---|---|---|
| 3,770,545 A | * | 11/1973 | Jackson | 152/221 |
| 3,843,475 A | * | 10/1974 | Kent | 428/35.8 |
| 4,115,974 A | | 9/1978 | Purcell | 52/512 |
| 4,220,681 A | * | 9/1980 | Narita | 296/128 X |
| 4,671,974 A | * | 6/1987 | Murachi | 293/128 X |
| RE32,819 E | * | 1/1989 | Waugh | 293/128 X |
| 4,965,103 A | | 10/1990 | Roberts et al. | 428/31 |
| 5,139,830 A | * | 8/1992 | Gross | 293/128 X |
| 5,219,626 A | * | 6/1993 | Irrgang | 293/128 X |
| 5,286,536 A | * | 2/1994 | Gross et al. | 293/128 X |
| 5,368,903 A | | 11/1994 | Trier | 428/31 |
| 5,399,393 A | * | 3/1995 | Zoller | 293/128 X |
| 5,571,581 A | | 11/1996 | Koizumi et al. | |

FOREIGN PATENT DOCUMENTS

| | | |
|---|---|---|
| DE | 553 338 C | 6/1932 |
| DE | 88 11 467 U | 10/1988 |
| DE | 42 19 344 A | 12/1992 |
| EP | 0 038 955 A | 11/1981 |
| GB | 376889 | 7/1932 |
| GB | 377143 | 7/1932 |
| GB | 377144 | 7/1932 |

* cited by examiner

*Primary Examiner*—Stephen T. Gordon
*Assistant Examiner*—Lori L. Coletta
(74) *Attorney, Agent, or Firm*—Fay, Sharpe, Fagan, Minnich & McKee, LLP

(57) ABSTRACT

There is provided an elongate body side molding suitable for attachment to the side of a vehicle body, which molding comprises:

i) one or more stabilising strip(s);

ii) one or more layer(s) of a polymeric material with a relatively high coefficient of thermal expansion; and iii) one or more layer(s) of a polymeric material with a relatively low coefficient of thermal expansion;

the layers of polymeric material with high and low coefficients of thermal expansion being so arranged that, over a predetermined range of temperatures, the overall shape of the body side molding is substantially maintained.

7 Claims, 4 Drawing Sheets

BODY SIDE MOULDING

BACKGROUND OF THE INVENTION

This invention relates to an elongate body side moulding suitable for attachment to the side of a vehicle body and to a vehicle with such a moulding attached.

In the automotive industry, it is relatively common to fit elongate mouldings of elastomeric material to the side body panels of a vehicle. Such mouldings are decorative and afford a degree of protection to the vehicle body upon side impact. The mouldings form a physical barrier to objects in a side-on collision and have a degree of deformability which will absorb a low-impact blow. The mouldings therefore protect the vehicle to an small extent from damage such as denting the body panels or scratching the paintwork.

Such mouldings may also comprise one or more metal strip(s) or a metal core, which is included to prevent the moulding from shrinking to a significant extent at low temperatures, in other words the metal strip gives the moulding temperature length stability. The metal strip also gives the moulding a degree of lateral stiffness.

One problem associated with body side mouldings which comprise metal strip(s) is that, at low temperatures, they have a tendency to become detached from the side of the vehicle body. As the elastomeric material has a higher coefficient of thermal expansion than the metal, the moulding is caused to bend at low temperatures, so that the ends of the moulding lift off from the side of the vehicle (as shown in FIG. 2).

This effect is reduced to a certain extent in body side moulding designs in which the metal strip is located within the elastomeric material (as shown in FIG. 3). However, the propensity for such mouldings to become detached from the vehicle at low temperatures is dependent on the location of the metal strip within the moulding.

SUMMARY OF THE INVENTION

According to a first aspect of the present invention there is provided an elongate body side moulding suitable for attachment to the side of a vehicle body, which moulding comprises:

i) one or more stabilising strip(s);

ii) one or more layer(s) of a polymeric material with a relatively high coefficient of thermal expansion; and iii) one or more layer(s) of a polymeric material with a relatively low coefficient of thermal expansion;

the layers of polymeric material with high and low coefficients of thermal expansion being so arranged that, even at relatively low temperatures, the overall shape of the body side moulding is substantially maintained.

In particular, the layers of polymeric material with high and low coefficients of thermal expansion are so arranged that, even at relatively low temperatures, the body side moulding does not curve significantly about an axis parallel to the general plane of the strip(s) and perpendicular to the length of the strip(s).

According to a second aspect of the present invention there is provided an elongate body side moulding suitable for attachment to the side of a vehicle body, which moulding comprises:

i) one or more stabilising strip(s);

ii) one or more layer(s) of a polymeric material with a relatively high coefficient of thermal expansion; and iii) one or more layer(s) of a polymeric material with a relatively low coefficient of thermal expansion;

wherein the layers of polymeric material with high and low coefficients of thermal expansion are so arranged that, when the moulding is attached to the side of a vehicle body, and subjected to relatively low temperature, the moulding tends to curve, about a axis parallel to the general plane of the strip(s) and perpendicular to the length of the strip(s), such that the two ends of the moulding are urged towards the side of the vehicle body.

Preferably the moulding comprises a first layer and a second layer wherein:

i) the first layer is made from the polymeric material with the relatively low coefficient of expansion and, when the moulding is fitted to the side of a vehicle body, is relatively far from the vehicle body;

ii) the second layer is made from the polymeric material with the relatively high coefficient of expansion and, when the moulding is fitted to the side of a vehicle body, is relatively close to the vehicle body; and iii) the stabilising strip is positioned between the first and second layers.

According to a third aspect of the present invention there is provided a vehicle which has fitted to it a moulding according to the first or second aspect of the present invention.

By using two kinds of elastomeric materials (with different coefficients of thermal expansion) the present inventors have shown that it is possible to reduce the extent to which metal-containing body-side mouldings curve such that they become detached from the vehicle body. It is also possible to control the curvature, so that at low temperatures, the moulding tends to curve in such a way that the ends are pushed on to the vehicle body side. A further advantage of the body side moulding in accordance with the present invention is that their propensity for curvature at low temperatures is less sensitive to the location of the stabilising strip on or in the moulding.

BRIEF DESCRIPTION OF THE DRAWINGS

For a better understanding of the present invention and to show how the same may be put into effect, reference will now be made, by way of example, to FIGS. 1 to 4 of the accompanying drawings, in which.

DETAILED DESCRIPTION OF THE INVENTION

Figure 1:
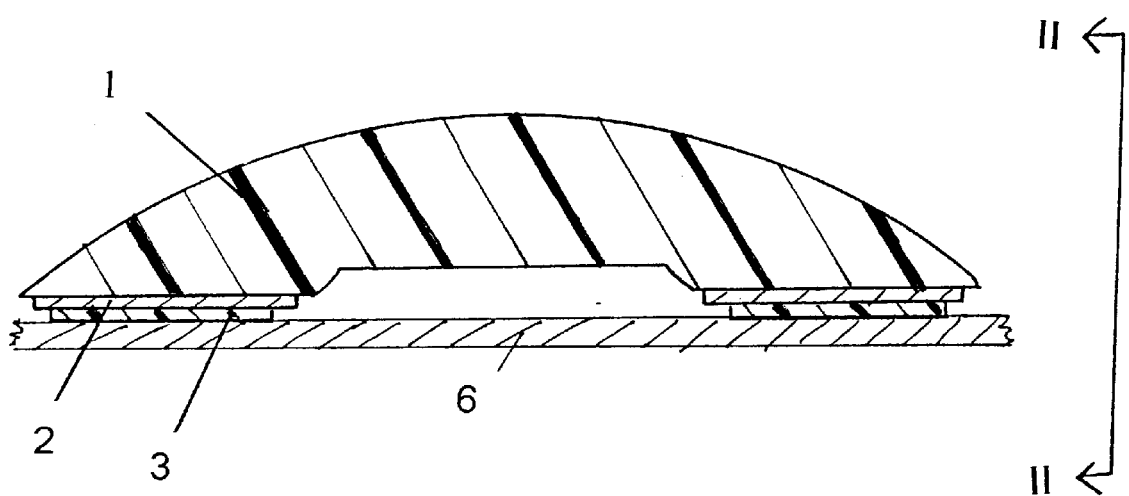
FIG. 1 is a lateral cross section of a body side moulding of the prior art.

Referring firstly to FIG. 1, there is shown a moulding which comprises a generally segment-shaped body 1 made from polymeric material, to the flat surface of which body 1 are adhered two strips of aluminium 2. A strip of double-sided tape 3 is adhered to each aluminium strip 2, in order to facilitate attachment of the moulding to the side of a vehicle body 6. Reference numerals 1, 2, 3 and 6 indicate equivalent features in the body side mouldings shown in FIGS. 2 to 4.

Figure 2:
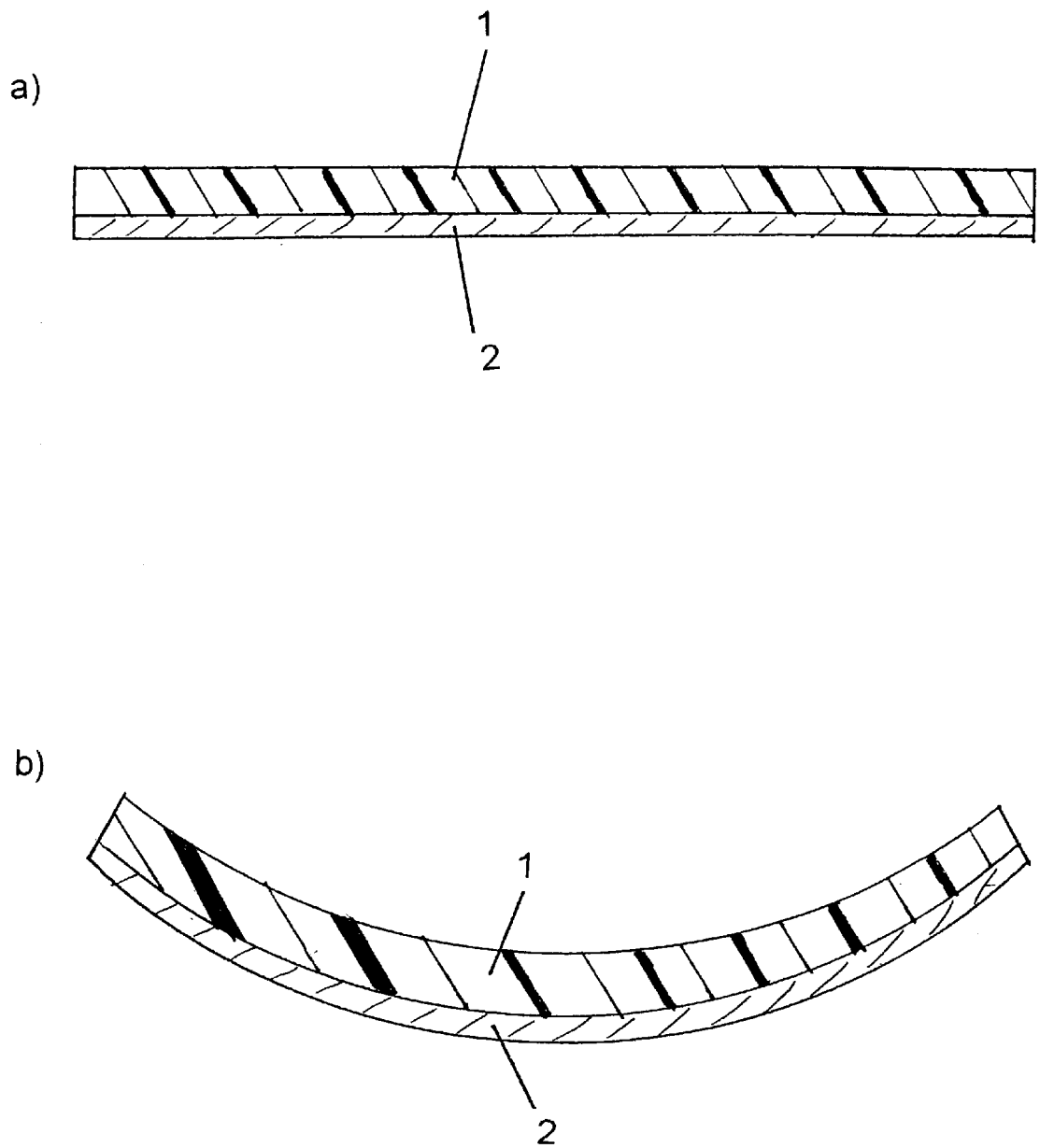
FIG. 2 is a sketch to show the effect of low temperatures on a moulding of the prior art from the direction II—II shown in FIG. 1.

FIG. 2 is a sketch to illustrate one of the disadvantages of mouldings such as the one shown in FIG. 1. FIGS. 2a and 2b show a side view of a moulding from the direction II—II (FIG. 1) without showing the double sided tape. The size of the aluminium strip is exaggerated for clarity. FIG. 2a shows the configuration of the moulding at ambient temperatures, whereas FIG. 2b shows the configuration of the moulding at low temperatures.

Figure 3:
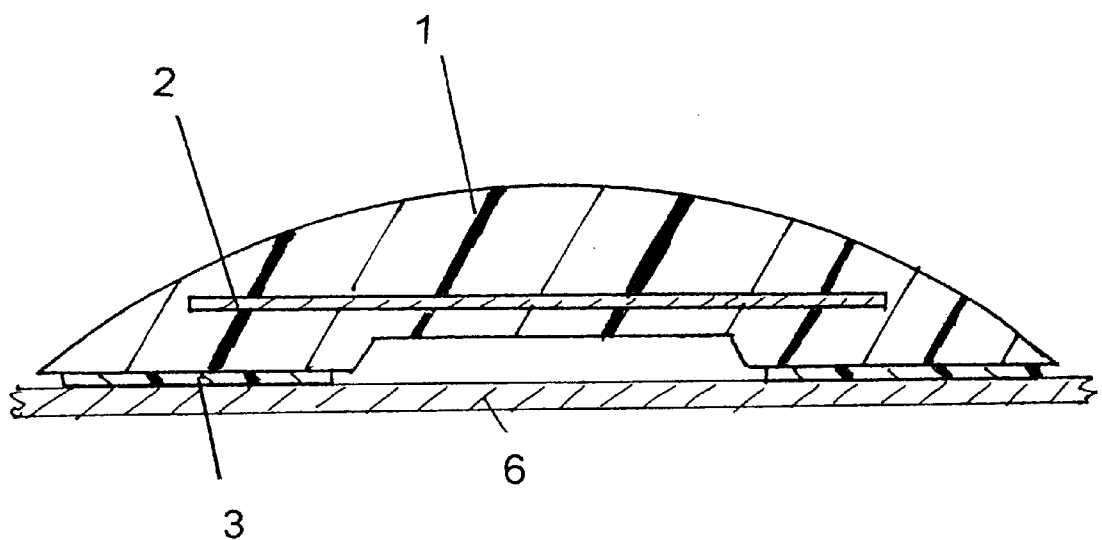
FIG. 3 is a lateral cross section of an alternative body side moulding of the prior art.

Turning to FIG. 3, there is shown a body side moulding in which the aluminium strip 2 is located within the body 1 made from polymeric material. Body side mouldings of this general design are more resistant to curvature at low temperatures than those shown in FIG. 1, but the effect is sensitive to the location of the aluminium strip 2 in the body 1 of the moulding.

Figure 4:
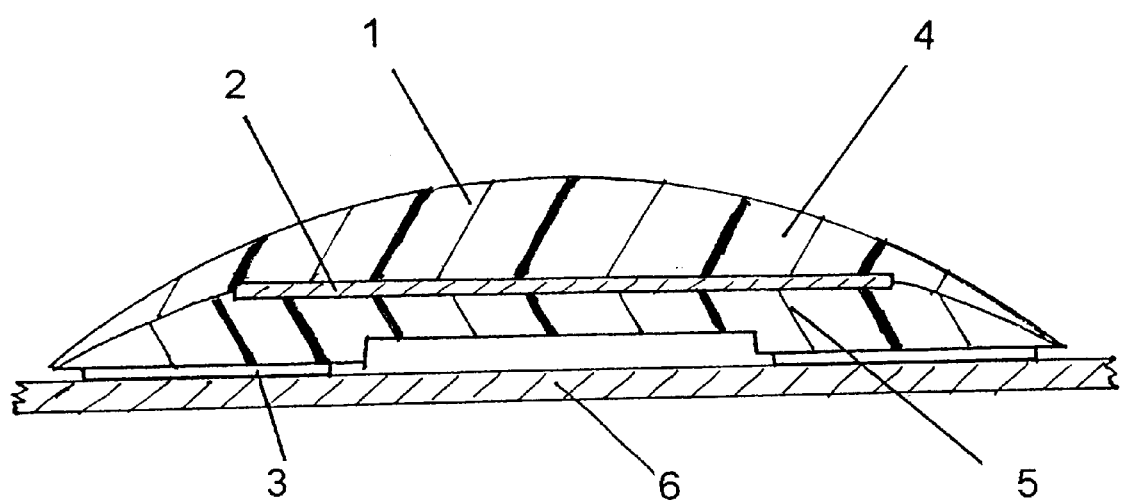
FIG. 4 is a lateral cross section of a body side moulding in accordance with the present invention.

FIG. 4 shows a body side moulding in accordance with the present invention. The body 1 is made up of two layers of polymeric material 4, 5. A first layer 4 which is made from a polymeric material with a relatively low coefficient of thermal expansion, and a second layer 5 which is made from a polymeric material with a relatively high coefficient of thermal expansion. The two layers 4, 5 are so positioned that at low temperatures the moulding does not curve significantly in the orientation shown in FIG. 2b. By careful selection of the two polymeric materials, it is possible to produce a moulding which does not curve to any appreciable extent at low temperatures or tends to curve in the opposite orientation, so as to "push" the ends of the moulding towards the vehicle body.

The stabilising strip may be made from a metal such as aluminium or steel, or it may be made from a plastics material. Preferably the stabilising strip is aluminium.

The term "strip" is intended to include any elongate structure which, when applied to a body-side moulding material such as PVC, may cause the moulding to curve at low temperatures.

By "low temperature", temperature below, for example, −35° C. may be indicated.

The material with a relatively low coefficient of thermal expansion may have a coefficient of thermal expansion of in the range of, for example, 60–40×10$^{-6}$/° C., preferably 55–45×10$^{-6}$/° C., more preferably about 50×10$^{-6}$/° C. The material with a relatively high coefficient of thermal expansion may have a coefficient of thermal expansion in the range of, for example, 160–140×10$^{-6}$/° C., preferably 155–145×10$^{-6}$/° C., more preferably 150×10$^{-6}$/° C.

The term "polymeric material" includes materials such as PVC or polypropylene. The coefficients of expansion may be adjusted by varying the amount of the filler in the material.

The term "vehicle" is intended to include automotive vehicles such as cars, vans, buses and lorries. The term also includes towable "vehicles" such as caravans, trailers and side-cars.

What is claimed is:

1. An elongate body side moulding suitable for attachment to a side of an associated vehicle body, which moulding comprises:

i) a stabilizing strip;
   ii) a layer of a polymeric material with a relatively high coefficient of thermal expansion; and
   iii) a layer of a polymeric material with a relatively low coefficient of thermal expansion;
   the layers of polymeric material with high and low coefficients of thermal expansion being so arranged that, even at relatively low temperatures, an overall shape of the body side moulding is substantially maintained.

2. The body side moulding according to claim 1, in which the layers of polymeric material with high and low coefficients of thermal expansion are so arranged that, even at relatively low temperatures, the body side moulding does not curve significantly about an axis parallel to a general plane of the strip and perpendicular to a length of the strip.

3. An elongate body side moulding suitable for attachment to a side of an associated vehicle body, which moulding comprises:

i) a stabilizing strip;
   ii) a layer of a polymeric material with a relatively high coefficient of thermal expansion; and
   iii) a layer of a polymeric material with a relatively low coefficient of thermal expansion;
   the layers of polymeric material with high and low coefficients of thermal expansion being so arranged that, when the moulding is attached to the side of the associated vehicle body and subjected to relatively low temperatures, the moulding tends to curve, about an axis parallel to a general plane of the strip and perpendicular to a length of the strip, such that two ends of the moulding are urged towards the side of the associated vehicle body.

4. The moulding according to claim 3, which comprises a first layer and a second layer wherein:

i) the first layer is made from the polymeric material with the relatively low coefficient of expansion and, when the moulding is fitted to the side of the associated vehicle body, is spaced apart from the associated vehicle body;
   ii) the second layer is made from the polymeric material with the relatively high coefficient of expansion and, when the moulding is fitted to the side of the associated vehicle body, is interposed between the associated vehicle body and said first layer; and
   iii) the stabilizing strip is embedded between the first and second layers.

5. The combination of the moulding according to claim 1 and the associated vehicle body, said moulding being adhesively secured to said associated vehicle body.

6. The moulding according to claim 5, which comprises a first layer and a second layer wherein:

i) the first layer is made from the polymeric material with the relatively low coefficient of expansion and, when the moulding is fitted to the side of the associated vehicle body, is spaced apart from the associated vehicle body;
   ii) the second layer is made from the polymeric material with the relatively high coefficient of expansion and, when the moulding is fitted to the side of the associated vehicle body, is interposed between the associated vehicle body and said spaced apart first layer; and
   iii) the stabilizing strip is embedded between the first and second layers.

7. The combination of the moulding according to claim 3 and the associated vehicle body, said moulding being adhesively secured to said associated vehicle body.

* * * * *